(12) United States Patent
Bucher et al.

(10) Patent No.: US 9,169,756 B2
(45) Date of Patent: Oct. 27, 2015

(54) EXHAUST GAS COOLER FOR COOLING COMBUSTION EXHAUST GAS OF AN INTERNAL COMBUSTION ENGINE, WATER COLLECTING ADAPTER, EXHAUST GAS COOLING SYSTEM AND METHOD FOR MANUFACTURING AN EXHAUST GAS COOLING SYSTEM

(71) Applicant: Behr GmbH & Co. KG, Stuttgart (DE)

(72) Inventors: Wolfgang Bucher, Stuttgart (DE); Oliver Grill, Moetzingen (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 14/058,875

(22) Filed: Oct. 21, 2013

(65) Prior Publication Data

US 2014/0075926 A1    Mar. 20, 2014

Related U.S. Application Data

(63) Continuation of application No. PCT/EP2012/057196, filed on Apr. 19, 2012.

(30) Foreign Application Priority Data

Apr. 20, 2011    (DE) .................. 10 2011 007 748

(51) Int. Cl.
*F01N 5/02* (2006.01)
*F01N 3/08* (2006.01)
(Continued)

(52) U.S. Cl.
CPC ............ *F01N 3/0807* (2013.01); *F01N 3/0205* (2013.01); *F02M 25/0737* (2013.01);
(Continued)

(58) Field of Classification Search
USPC .................... 60/274, 298, 310, 320
See application file for complete search history.

(56) References Cited

U.S. PATENT DOCUMENTS 6,536,516 B2    3/2003  Davies et al.
2004/0025501 A1*  2/2004  Endoh et al. ............... 60/320
(Continued)

FOREIGN PATENT DOCUMENTS

| CN | 1481472 A | 3/2004 |
|---|---|---|
| DE | 103 12 788 A1 | 9/2004 |
| DE | 10 2009 015 849 A1 | 12/2009 |
| DE | 10 2009 010 039 A1 | 9/2010 |
| EP | 0 930 429 A2 | 7/1999 |
| EP | 1 367 253 A1 | 12/2003 |
| EP | 1 770 250 A2 | 4/2007 |
| JP | 2000-266494 A | 9/2000 |

OTHER PUBLICATIONS

Chinese Office Action for Chinese Application No. 201280018737.5 dated May 5, 2015 with English translation.

*Primary Examiner* — Jason Shanske
*Assistant Examiner* — Jorge Leon, Jr.
(74) *Attorney, Agent, or Firm* — Muncy, Geissler, Olds & Lowe, P.C.

(57) ABSTRACT

An exhaust gas cooler for cooling combustion exhaust gas of an internal combustion engine having a cooling medium, wherein the exhaust gas cooler has an exhaust gas inlet for introducing hot combustion exhaust gas into the exhaust gas cooler. Furthermore, the exhaust gas cooler has an exhaust gas outlet for directing cooled combustion exhaust gas out of the exhaust gas cooler, wherein the exhaust gas outlet is fluidically connected to the exhaust gas inlet. Furthermore, the exhaust gas cooler has at least one coolant inlet for fluidically connecting the exhaust gas cooler to at least one coolant outlet of the internal combustion engine. Furthermore, the exhaust gas cooler has an interface for fluidically connecting a water collecting adapter, wherein the interface is designed to carry the coolant out of the exhaust gas cooler.

14 Claims, 1 Drawing Sheet

(51) Int. Cl.
*F01N 3/02* (2006.01)
*F28D 7/16* (2006.01)
*F28D 21/00* (2006.01)
*F01N 3/28* (2006.01)
*F02M 25/07* (2006.01)
*F01N 3/04* (2006.01)
*F28D 7/00* (2006.01)

(52) U.S. Cl.
CPC ............... *F28D 7/16* (2013.01); *F28D 7/1607* (2013.01); *F28D 21/0003* (2013.01); *F01N 3/043* (2013.01); *F01N 3/2889* (2013.01); *F01N 2240/02* (2013.01); *F01N 2260/024* (2013.01); *F02M 25/0735* (2013.01); *F28D 7/0075* (2013.01); *Y02T 10/121* (2013.01); *Y02T 10/20* (2013.01); *Y10T 29/49359* (2015.01)

(56) References Cited

U.S. PATENT DOCUMENTS

| | | |
|---|---|---|
| 2005/0199228 A1 | 9/2005 | Yamashita |
| 2007/0251232 A1* | 11/2007 | de Kok et al. .................... 60/599 |
| 2008/0202724 A1* | 8/2008 | Lorenz et al. .................... 165/51 |
| 2008/0257317 A1* | 10/2008 | Cerabone et al. ........ 123/568.12 |
| 2008/0302094 A1* | 12/2008 | Yoon ............................... 60/320 |
| 2009/0090495 A1* | 4/2009 | Domes et al. ................. 165/165 |
| 2009/0250201 A1* | 10/2009 | Grippe et al. ................. 165/164 |
| 2010/0044019 A1 | 2/2010 | Maeda et al. |
| 2010/0288478 A1* | 11/2010 | Barron et al. ................. 165/173 |
| 2011/0247318 A1* | 10/2011 | Kuroyanagi et al. ........... 60/278 |
| 2011/0289905 A1* | 12/2011 | Acre et al. ...................... 60/320 |
| 2011/0308778 A1* | 12/2011 | Tsuda et al. ................. 165/157 |
| 2012/0066905 A1* | 3/2012 | Grippe et al. ............ 29/890.053 |

* cited by examiner

EXHAUST GAS COOLER FOR COOLING COMBUSTION EXHAUST GAS OF AN INTERNAL COMBUSTION ENGINE, WATER COLLECTING ADAPTER, EXHAUST GAS COOLING SYSTEM AND METHOD FOR MANUFACTURING AN EXHAUST GAS COOLING SYSTEM

This nonprovisional application is a continuation of International Application No. PCT/EP2012/057196, which was filed on Apr. 19, 2012, and which claims priority to German Patent Application No. DE 10 2011 007 748.0, which was filed in Germany on Apr. 20, 2011, and which are both herein incorporated by reference.

BACKGROUND OF THE INVENTION

1. Field of the Invention

The present invention relates to an exhaust gas cooler for cooling combustion exhaust gas of an internal combustion engine with a coolant, to a water collecting adapter for directing coolant out of the exhaust gas cooler, to an exhaust gas cooling system for a multi-cylinder internal combustion engine, and to a method for manufacturing an exhaust gas cooling system.

2. Description of the Background Art

In a conventional exhaust gas cooler for an exhaust gas recirculation in the intake tract of an internal combustion engine, hot combustion exhaust gas is directed out of the internal combustion engine to an exhaust gas cooler in order to be cooled there by ambient air. A coolant can also be used to cool the combustion exhaust gas.

To this end, EP 0 930 429 B1 discloses a device for cooling recirculated exhaust gas of a liquid-cooled internal combustion engine.

SUMMARY OF THE INVENTION

It is therefore an object of the present invention to provide an improved exhaust gas cooler for cooling combustion exhaust gas of an internal combustion engine, an improved water collecting adapter for directing coolant out of the exhaust gas cooler, an improved exhaust gas cooling system for a multi-cylinder internal combustion engine, and an improved method for manufacturing an exhaust gas cooling system.

In an embodiment, the object is attained by an exhaust gas cooler for cooling combustion exhaust gas of an internal combustion engine with a coolant, a water collecting adapter for directing coolant out of the exhaust gas cooler, and an exhaust gas cooling system for a multi-cylinder internal combustion engine according to the main claims.

Hitherto, for improved space utilization in internal combustion engines, peripherally disposed components are disposed closer to a central engine block. To enable in addition short feed and discharge paths to the components, the components, such as charge air coolers or exhaust gas coolers, are sometimes bolted directly to the engine block. As a result, an improved response behavior occurs in load changes, because a smaller air mass or gas mass must be accelerated or slowed down. Coolers bolted directly to the engine block can be supplied with coolant directly from the engine block. However, it is then necessary to develop and stock different coolers for different engines, because the number and position of interfaces to the cooler varies in the different engines.

The present invention is based on the realization that savings can be achieved in development costs, tool costs, and production costs, when a standardized cooler can be used in different engine variants with a different number of cylinders. To this end, a modular exhaust gas heat exchanger can have a minimum number of interfaces in a component, which are the same in all relevant internal combustion engine variants. The relevant internal combustion engine variants with a higher number of interfaces can be connected via an adapter, which is connected directly to the exhaust gas heat exchanger. To this end, the exhaust gas heat exchanger and the adapter can have a mutual interface for connection.

Advantageously, a plurality of engine variants can be connected with several variants of the adapter and the standardized exhaust gas heat exchanger, whereby the variants of the adapter can be produced especially cost-effectively.

In an embodiment, the present invention provides an exhaust gas cooler for cooling combustion exhaust gas of an internal combustion engine with a coolant, whereby the exhaust gas cooler can have the following features: an exhaust gas inlet for introducing hot combustion exhaust gas into the exhaust gas cooler; an exhaust gas outlet for directing cooled combustion exhaust gas out of the exhaust gas cooler, whereby the exhaust gas outlet is fluidically connected to the exhaust gas inlet; at least one coolant inlet for fluidically connecting the exhaust gas cooler to at least one coolant outlet of the internal combustion engine; and an interface for fluidically connecting a water collecting adapter, whereby the interface is designed to carry the coolant out of the exhaust gas cooler.

An exhaust gas cooler can be understood to be a heat exchanger that is designed to cool combustion exhaust gas with coolant. To this end, the exhaust gas cooler may have, for example, a tube bundle for carrying the combustion exhaust gas from the exhaust gas inlet to the exhaust gas outlet. The tube bundle can also carry the coolant. The coolant can be, for example, cooling water. A coolant inlet can be a connecting piece, which is designed to carry the coolant from the internal combustion engine to the exhaust gas cooler. A coolant outlet can be an interface to the internal combustion engine, which is designed to provide a direct connection to a coolant channel and during operation to a coolant flow in the internal combustion engine. An interface can be understood to be a transfer point for the coolant from the exhaust gas cooler to a water collecting adapter. For example, the interface can be designed to correspond to an interface of the water collecting adapter. Likewise, the interface can be designed as a mirror image of the interface of the water collecting adapter. The interface can also be oriented like the interface of the water collecting adapter. The exhaust gas cooler can have a box-like housing, in which the exhaust gas inlet is arranged on a first end wall, and the exhaust gas outlet is arranged on an end wall opposite the exhaust gas inlet.

The at least one coolant inlet can project from the exhaust gas cooler transverse to a flow direction of the combustion exhaust gas in the exhaust gas cooler and has an attachment component for attaching the exhaust gas cooler to the internal combustion engine. The attachment component can be, for example, at least one mounting hole, a sealing surface, and/or a guide surface. The exhaust gas cooler can be attached thereby directly to the internal combustion engine and mounted without a holding device.

Further, the at least one coolant inlet can be angled. The coolant inlet can have a curvature, which makes it possible to attach the exhaust gas cooler close to the internal combustion engine. Valuable space can be saved in this way and accessibility for mounting the exhaust gas cooler can be assured.

Moreover, the interface for connecting the water collecting adapter can project from the exhaust gas cooler on the exhaust gas cooler side on which the at least one coolant inlet is arranged. In this regard, the interface can be designed to carry the coolant out of the exhaust gas cooler in a flow direction of the combustion exhaust gas. The water collecting adapter can be attached thereby directly to the other water outlet, without increasing fluid resistance due to the narrow curve radii.

The exhaust gas cooler may have a second coolant inlet for fluidically connecting the exhaust gas cooler to a second coolant outlet of the internal combustion engine and a third coolant inlet for fluidically connecting the exhaust gas cooler to a third coolant outlet of the internal combustion engine. A broadest possible engine range can be covered by an embodiment with three coolant inlets. For example, two identical exhaust gas coolers are used in a six-cylinder engine in a V arrangement. A water collecting adapter with an additional coolant inlet can be used for a four-cylinder engine in a side-by-side arrangement. A water collecting adapter with three additional coolant inlets can be used for a six-cylinder engine in a side-by-side arrangement.

Further, the exhaust gas cooler can have at the exhaust gas inlet a flange for attaching an exhaust gas supply device and at the exhaust gas outlet a flange for attaching an exhaust gas discharge device. The exhaust gas cooler can be maintained in a simple way by means of a flange connection.

In an embodiment, the present invention also provides a water collecting adapter for directing coolant out of an exhaust gas cooler according to an embodiment of the invention, whereby the water collecting adapter has the following features: an interface for fluidically connecting the water collecting adapter to the interface of the exhaust gas cooler; at least one coolant inlet for fluidically connecting to at least one further coolant outlet of the internal combustion engine; and a coolant outlet.

An interface can be understood to be a transfer point for the coolant from the exhaust gas cooler to the water collecting adapter. For example, the interface can be oriented and/or designed the same as the interface of the exhaust gas cooler. A coolant inlet can be a connecting piece, which is designed to carry the coolant from the internal combustion engine to the water collecting adapter. Through the coolant inlet the water collecting adapter can direct coolant out of parts of the internal combustion engine, which are not connected to the exhaust gas cooler. A uniform cooling of the entire internal combustion engine can be achieved thereby.

Further, the at least one coolant inlet has an attachment component for attaching the water collecting adapter to the internal combustion engine. Attachment component can be, for example, at least one mounting hole, a sealing surface, and/or a guide surface. The water collecting adapter can be attached directly therewith to the internal combustion engine and mounted without a holding device.

Further, in an embodiment, the present invention provides an exhaust gas cooling system for a multi-cylinder internal combustion engine, whereby the exhaust gas cooling system has the following features: an exhaust gas cooler for cooling the combustion exhaust gas of the internal combustion engine according to the approach presented here; and a water collecting adapter for directing coolant out of the exhaust gas cooler according to the approach presented here, whereby the interface of the water collecting adapter is fluidically connected to the interface of the exhaust gas cooler.

The exhaust gas cooling system can have a sealing element for the fluid-tight connection of the interface of the exhaust gas cooler to the interface of the water collecting adapter. In this regard, the sealing element can be arranged between the interface of the exhaust gas cooler and the interface of the water collecting adapter. The sealing element can be designed to compensate radial and axial movements of the exhaust gas cooler relative to the water collecting adapter. As a result, vibrations and thermal distortion can be compensated, without a negative impact on the tightness of the connection. Likewise, the water collecting adapter can be connected by material bonding to the exhaust gas cooler.

In addition, the present invention provides, in an embodiment, a method for manufacturing an exhaust gas cooling system for a multi-cylinder internal combustion engine, with the following steps: providing an exhaust gas cooler according to the approach presented here; selecting a water collecting adapter according to the approach presented here, whereby a number of coolant inlets is equal to a difference between a number of coolant outlets on the internal combustion engine and a number of coolant inlets on the exhaust gas cooler; connecting the exhaust gas cooler to the water collecting adapter.

In regard to the number of coolant outlets on the internal combustion engine, these can be coolant outlets arranged in a row. By selecting a suitable water collecting adapter for a standardized exhaust gas cooler, different engine variants can be equipped with different numbers of coolant outlets with a small number of different parts for the exhaust gas cooling system. As a result, tool costs decline, because the different water collecting adapters are simple to produce and do not have complicated contours. Likewise, the unit cost for the exhaust gas cooler declines, because the work tools for the exhaust gas cooler can be better utilized due to the high quantities. In the connecting step, the exhaust gas cooler and the water collecting adapter can be connected to one another directly or via a suitable adapter.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limiting of the present invention, and wherein.

DETAILED DESCRIPTION

Figure 1:
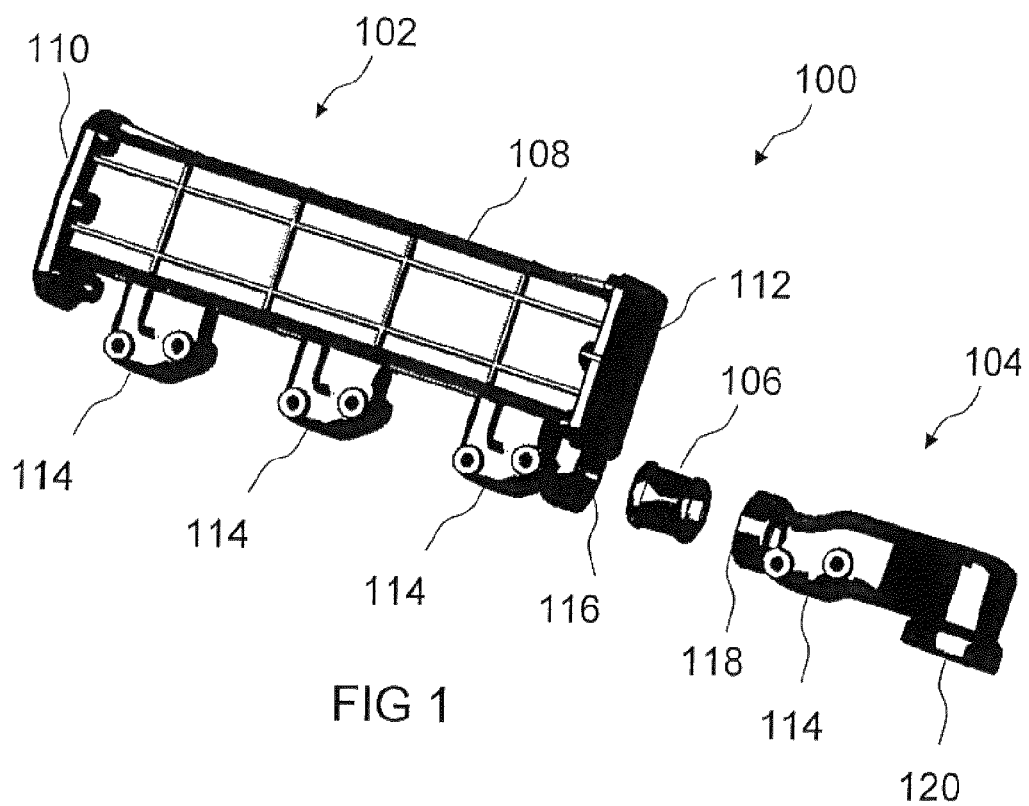
FIG. 1 is a spatial illustration of an exhaust gas cooling system according to an exemplary embodiment of the present invention.

In the following description of the preferred exemplary embodiments of the present invention, the same or similar reference characters are used for elements with a similar action and shown in the different drawings, whereby a repeated description of these elements is omitted.

FIG. 1 shows a spatial illustration of an exhaust gas cooling system 100 according to an exemplary embodiment of the present invention. Exhaust gas cooling system 100 comprises an exhaust gas cooler 102 according to an exemplary embodiment of the present invention. Further, exhaust gas cooling system 100 comprises a water collecting adapter 104 according to an exemplary embodiment of the present invention. Exhaust gas cooler 102 and water collecting adapter 104 are connected fluid-tight by sealing element 106 in an installed state not shown in the figures. The exhaust gas cooling system 100 shown here is suitable for cooling combustion exhaust gas of an internal combustion engine with four cylinders.

Exhaust gas cooler 102 has a housing 108. Housing 108 has a box-like shape with reinforcement ribs. An exhaust gas inlet 110 is arranged on a first end wall of housing 108. An exhaust gas outlet 112 is arranged on a second end wall opposite to the first end wall of housing 108. Exhaust gas inlet 110 is connected via a tube bundle of heat exchanger tubes fluidically to exhaust gas outlet 112. Housing 108 has a flange with a plurality of mounting holes at exhaust gas inlet 110 and at exhaust gas outlet 112. Exhaust gas cooler 102 has three coolant inlets 114. Coolant inlets 114 are arranged at regular intervals and in a line on a narrow side of housing 108, said side connecting the end walls. Coolant inlets 114 project from the housing and are designed to connect exhaust gas cooler 102 fluidically to three of four coolant outlets of the internal combustion engine. Coolant inlets 114 have an offset shape. Coolant inlets 114 have two mounting holes and a sealing surface as an attaching component for attaching exhaust gas cooler 102 to the internal combustion engine. In the area of the second end wall, exhaust gas cooler 102 has an interface 116 for fluidically attaching a water collecting adapter. Interface 116 is fluidically connected to coolant inlets 114. Interface 116 projects from housing 108 on the same narrow side as coolant inlets 114. Interface 116 has a round cross section.

Water collecting adapter 104 has an interface 118 for fluidically connecting water collecting adapter 104 to interface 116 of exhaust gas cooler 102. Interface 118 has a round cross section. Water collecting adapter 104 has a further coolant inlet 114. Coolant inlet 114 at water collecting adapter 104 is designed to connect water collecting adapter 104 fluidically to the fourth coolant outlet of the internal combustion engine. Coolant inlet 114 also has two mounting holes and a sealing surface as an attachment component for attaching water collecting adapter 104 to the internal combustion engine. Further, water collecting adapter 104 has a coolant outlet 120. Coolant outlet 120 is fluidically connected to interface 118 and coolant inlet 114. Coolant outlet 120 has a round cross section and is oriented transverse to a main extension direction of water collecting adapter 104. Water collecting adapter 104 has no exhaust gas circulation. Water collecting adapter 104 has as connections only interface 118, coolant outlet 120, and a number of coolant inlets 114. In this case, the number of coolant inlets 114 of water collecting adapter 104 corresponds to a total number of coolant outlets of an engine block, which is to be served by exhaust gas cooling system 100, minus the number of coolant inlets 114 on exhaust gas cooler 102.

Figure 2:
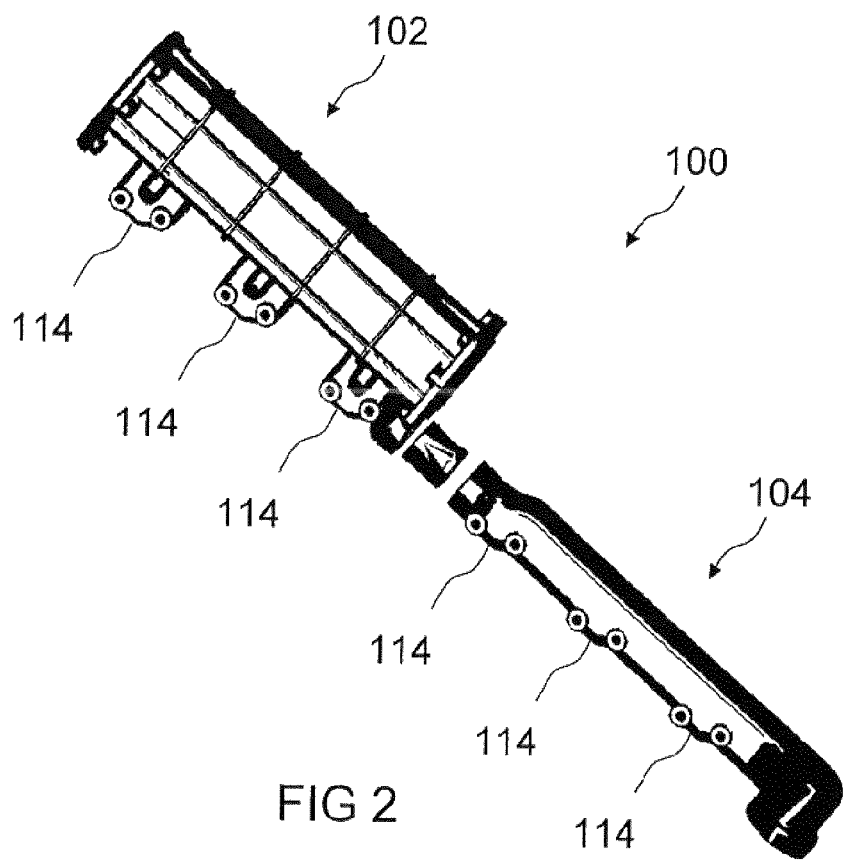
FIG. 2 is a spatial illustration of an exhaust gas cooling system according to an exemplary embodiment of the present invention.

FIG. 2 shows a spatial illustration of exhaust gas cooling system 100 according to an exemplary embodiment of the present invention. Exhaust gas cooling system 100 shown here is suitable for cooling a combustion exhaust gas of an internal combustion engine with six cylinders. Exhaust gas cooling system 100 comprises an exhaust gas cooler 102 as it is described in FIG. 1. Further, exhaust gas cooling system 100 comprises a water collecting adapter 104 as it is described in FIG. 1. In addition to the features explained in FIG. 1, water collecting adapter 104 has two additional coolant inlets 114. Coolant inlets 114 are arranged at regular intervals along the main extension direction of water collecting adapter 104. Coolant inlets 114 on water collecting adapter 104 are designed to connect water collecting adapter 104 fluidically to the fourth, a fifth, and a sixth coolant outlet of the internal combustion engine. Coolant inlets 114 also have two mounting holes and a sealing surface as an attachment component for attaching water collecting adapter 104 to the internal combustion engine.

In other words, FIGS. 1 and 2 show an exhaust gas cooler 102 with modular water collecting adapter 104. A multi-component structure of the functional groups "exhaust gas cooling" and "water collection" is shown. The structural form of exhaust gas cooler 102 because of the addition of the adapter for combining the water collecting adapter 104 is independent of a cylinder number. In this design, water collection and discharge of the coolant, which flows through the engine, and the cooling of the exhaust gas with said water are realized in the case of different numbers of cylinders. Hitherto, a new housing 108 needs to be manufactured for each number of cylinders, which leads to a cost-intensive maintenance of variants. This results in greater material usage and therefore also in a higher weight of the entire component. In exhaust gas cooling system 100, the function of cooling the exhaust gas and collecting water is combined for a variable number of cylinders. An inclusion or omission of individual cylinders from engine model to engine model is taken into account in water collecting adapter 104. Exhaust gas coolant cooler 102 and water collecting adapter 104 can be connected fluid-tight by a sealing element 106, for example, a flat gasket, an O-ring connection, or a plug & seal element. In exhaust gas cooler 102, a partial flow of the first cylinder is collected and provided at interface 116 to water collecting adapter 104 (WCA). Water collecting adapter 104 is selected according to the remaining number of cylinders and connected to exhaust gas cooler 102. Alternatively, water collecting adapter 104 can be welded to exhaust gas cooler 102. A saving of weight results from a reduction of component size. A variable size of water collecting adapter 104 can be selected according to the number of cylinders.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An exhaust gas cooler for cooling combustion exhaust gas of an internal combustion engine with a coolant, the exhaust gas cooler comprising:
    an exhaust gas inlet for introducing hot combustion exhaust gas into the exhaust gas cooler;
    an exhaust gas outlet for directing cooled combustion exhaust gas out of the exhaust gas cooler, the exhaust gas outlet being fluidically connected to the exhaust gas inlet;
    at least one coolant inlet for fluidically connecting the exhaust gas cooler to at least one coolant outlet of the internal combustion engine; and
    an interface for fluidically connecting the exhaust gas cooler to a water collecting adapter, the interface being configured to carry the coolant out of the exhaust gas cooler,
    wherein the at least one coolant inlet projects from the exhaust gas cooler transverse to a flow direction of the combustion exhaust gas in the exhaust gas cooler and has an attachment component for attaching the exhaust gas cooler to the internal combustion engine.

2. The exhaust gas cooler according to claim 1, wherein the at least one coolant inlet is angled.

3. The exhaust gas cooler according to claim 1, wherein the interface for connecting the exhaust gas cooler to the water collecting adapter projects from the exhaust gas cooler on a side of the exhaust gas cooler, the side of the exhaust gas cooler being a same side on which the at least one coolant inlet is arranged, and wherein the interface is configured to carry the coolant out of the exhaust gas cooler in a flow direction of the combustion exhaust gas.

4. The exhaust gas cooler according to claim 1, further comprising:
- a second coolant inlet for fluidically connecting the exhaust gas cooler to a second coolant outlet of the internal combustion engine; and
- a third coolant inlet for fluidically connecting the exhaust gas cooler to a third coolant outlet of the internal combustion engine.

5. The exhaust gas cooler according to claim 1, wherein the interface is an outlet opening of the exhaust gas cooler, and
- wherein the outlet opening of the exhaust gas cooler connects to an inlet opening of the water collecting adapter.

6. A water collecting adapter for directing coolant out of an exhaust gas cooler, wherein the water collecting adapter comprises:
- a single housing that includes:
  - an interface for fluidically connecting the water collecting adapter to an interface of the exhaust gas cooler;
  - at least one coolant inlet for fluidically connecting to at least one coolant outlet of an internal combustion engine; and
  - a coolant outlet,
- wherein the interface of the water collecting adapter is an inlet opening that introduces coolant from the exhaust gas cooler, and
- wherein an axial direction of the inlet opening is perpendicular to an axial direction of the coolant outlet.

7. The water collecting adapter according to claim 6, wherein the at least one coolant inlet has an attachment component for attaching the water collecting adapter to the internal combustion engine.

8. The water collecting adapter according to claim 6, wherein the axial direction of the inlet opening is perpendicular to an axial direction of the at least one coolant inlet.

9. An exhaust gas cooling system for a multi-cylinder internal combustion engine, wherein the exhaust gas cooling system comprises:
- an exhaust gas cooler for cooling the combustion exhaust gas of the internal combustion engine, the exhaust gas cooler including:
  - an exhaust gas inlet for introducing hot combustion exhaust gas into the exhaust gas cooler;
  - an exhaust gas outlet for directing cooled combustion exhaust gas out of the exhaust gas cooler, the exhaust gas outlet being fluidically connected to the exhaust gas inlet;
  - at least one coolant inlet for fluidically connecting the exhaust gas cooler to at least one coolant outlet of the internal combustion engine; and
  - an interface being configured to carry the coolant out of the exhaust gas cooler; and
- a water collecting adapter for directing coolant out of the exhaust gas cooler, wherein an interface of the water collecting adapter is fluidically connected to the interface of the exhaust gas cooler,
- wherein the at least one coolant inlet projects from the exhaust gas cooler transverse to a flow direction of the combustion exhaust gas in the exhaust gas cooler and has an attachment component for attaching the exhaust gas cooler to the internal combustion engine, and
- wherein the water collecting adapter includes at least one coolant inlet for fluidically connecting the water collecting adapter to at least one coolant outlet of the internal combustion engine that is different from the at least one coolant outlet of the internal combustion engine to which the at least one coolant inlet of the exhaust gas cooler is connected, such that the water collecting adapter and the exhaust gas cooler are connected to different coolant outlets of the internal combustion engine.

10. The exhaust gas cooling system according to claim 9, further comprising a sealing element for a fluid-tight connection of the interface of the exhaust gas cooler to the interface of the water collecting adapter, wherein the sealing element is arranged between the interface of the exhaust gas cooler and the interface of the water collecting adapter, and wherein the sealing element is configured to compensate radial and axial movements of the exhaust gas cooler relative to the water collecting adapter.

11. The exhaust gas cooling system according to claim 9, the water collecting adapter further comprising a coolant outlet,
- wherein the interface of the water collecting adapter is an inlet opening that introduces coolant from the exhaust gas cooler, and wherein an axial direction of the inlet opening of the water collecting adapter is perpendicular to an axial direction of the coolant outlet of the water collecting adapter.

12. The exhaust gas cooling system according to claim 9, wherein the interface of the exhaust gas cooler projects from a same side of the exhaust gas cooler on which the at least one coolant inlet is arranged.

13. A method for manufacturing an exhaust gas cooling system for a multi-cylinder internal combustion engine, the method comprising:
- providing an exhaust gas cooler, the exhaust gas cooler including:
  - an exhaust gas inlet for introducing hot combustion exhaust gas into the exhaust gas cooler;
  - an exhaust gas outlet for directing cooled combustion exhaust gas out of the exhaust gas cooler, the exhaust gas outlet being fluidically connected to the exhaust gas inlet;
  - at least one coolant inlet for fluidically connecting the exhaust gas cooler to at least one coolant outlet of the internal combustion engine; and
  - an interface for fluidically connecting the exhaust gas cooler to a water collecting adapter, the interface being configured to carry the coolant out of the exhaust gas cooler,
- wherein the at least one coolant inlet projects from the exhaust gas cooler transverse to a flow direction of the combustion exhaust gas in the exhaust gas cooler and has an attachment component for attaching the exhaust gas cooler to the internal combustion engine;
- selecting the water collecting adapter, such that a number of coolant inlets at the water collecting adapter is equal to a difference between a number of coolant outlets on the internal combustion engine and a number of coolant inlets on the exhaust gas cooler; and
- connecting the exhaust gas cooler to the water collecting adapter.

14. The method according to claim 13, wherein the interface of the exhaust gas cooler projects from a same side of the exhaust gas cooler on which the at least one coolant inlet is arranged.

* * * * *